(12) United States Patent
Jackson (10) Patent No.: US 10,185,031 B2
(45) Date of Patent: Jan. 22, 2019

(54) PASSIVE RADAR WEATHER DETECTION SYSTEMS AND METHODS

(71) Applicant: The Boeing Company, Chicago, IL (US)

(72) Inventor: Bronwyn A. Jackson, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 551 days.

(21) Appl. No.: 14/951,201

(22) Filed: Nov. 24, 2015

(65) Prior Publication Data

US 2017/0146652 A1 May 25, 2017

(51) Int. Cl.
| | | |
|---|---|---|
| *G01S 13/87* | (2006.01) | |
| *G01S 7/41* | (2006.01) | |
| *G01S 13/89* | (2006.01) | |
| *G01S 13/95* | (2006.01) | |
| *G01S 7/00* | (2006.01) | |
| *G01S 5/00* | (2006.01) | |
| *G01S 13/00* | (2006.01) | |

(52) U.S. Cl.
CPC ............ *G01S 13/95* (2013.01); *G01S 5/0027* (2013.01); *G01S 7/003* (2013.01); *G01S 7/411* (2013.01); *G01S 13/003* (2013.01); *G01S 13/87* (2013.01); *G01S 13/89* (2013.01); *Y02A 90/18* (2018.01)

(58) Field of Classification Search
CPC ........ G01S 7/003; G01S 13/95; G01S 13/951; G01S 13/953; G01S 13/955; G01S 13/956; G01S 13/958
See application file for complete search history.

(56) References Cited

U.S. PATENT DOCUMENTS

| | | | | | |
|---|---|---|---|---|---|
| 5,410,314 | A | * | 4/1995 | Frush | G01S 13/003 342/26 D |
| 5,434,570 | A | * | 7/1995 | Wurman | G01S 13/003 342/26 D |
| 5,469,169 | A | * | 11/1995 | Frush | G01S 13/003 342/26 D |
| 5,471,211 | A | * | 11/1995 | Randall | G01S 13/003 342/26 D |
| 5,623,267 | A | * | 4/1997 | Wurman | G01S 13/003 342/26 D |
| 6,377,204 | B1 | * | 4/2002 | Wurman | G01S 13/003 342/59 |
| 6,456,226 | B1 | * | 9/2002 | Zheng | G01S 7/003 342/26 R |

(Continued)

*Primary Examiner* — Peter M Bythrow
(74) *Attorney, Agent, or Firm* — Haynes and Boone, LLP (57) ABSTRACT

Systems and methods according to one or more embodiments are provided for determining accurate, timely and economical weather detection information. Weather detection information may be provided by one or more passive radar receivers receiving reflected radar signals off atmospheric objects. In one example, a system includes one of more passive radar receivers configured to receive radar signals provided by one or more radar transmitter sources not associated with the one or more passive radar receivers. A data center receives and stores the radar signals from the one or more passive radar receivers. Radar signals are processed to form a radar image of an atmospheric object in the path of the radar transmitter sources. Additional systems and methods are also provided.

20 Claims, 5 Drawing Sheets

(56) References Cited

U.S. PATENT DOCUMENTS

| | | | | |
|---|---|---|---|---|
| 6,456,229 | B2* | 9/2002 | Wurman | G01S 13/003 |
| | | | | 342/59 |
| 6,462,699 | B2* | 10/2002 | Wurman | G01S 13/003 |
| | | | | 342/59 |
| 6,512,996 | B1* | 1/2003 | Praskovsky | G01S 7/41 |
| | | | | 702/189 |
| 6,522,295 | B2* | 2/2003 | Baugh | G01S 5/02 |
| | | | | 342/453 |
| 6,738,021 | B2* | 5/2004 | Benner | G01S 13/003 |
| | | | | 342/378 |
| 6,828,922 | B1* | 12/2004 | Gremmert | G01S 7/003 |
| | | | | 340/949 |
| 7,012,552 | B2* | 3/2006 | Baugh | G01S 5/12 |
| | | | | 340/945 |
| 7,518,543 | B2* | 4/2009 | Herberthson | G01S 13/003 |
| | | | | 342/104 |
| 8,072,382 | B2* | 12/2011 | Smith | G01S 5/0027 |
| | | | | 342/357.31 |
| 8,604,963 | B1* | 12/2013 | Kronfeld | G01S 7/003 |
| | | | | 342/26 B |
| 8,730,092 | B2* | 5/2014 | Jaffer | G01S 13/003 |
| | | | | 342/159 |
| 2001/0013839 | A1* | 8/2001 | Wurman | G01S 13/003 |
| | | | | 342/26 R |
| 2002/0014985 | A1* | 2/2002 | Wurman | G01S 13/003 |
| | | | | 342/26 R |
| 2009/0224965 | A1* | 9/2009 | Venkatachalam | G01S 7/12 |
| | | | | 342/26 R |
| 2015/0310747 | A1* | 10/2015 | Frolik | B64D 45/00 |
| | | | | 340/971 |
| 2016/0266249 | A1* | 9/2016 | Kauffman | G01S 7/003 |
| 2016/0306833 | A1* | 10/2016 | Esposito | G01S 7/003 |
| 2017/0038457 | A1* | 2/2017 | Wang | G01S 13/951 |

\* cited by examiner

PASSIVE RADAR WEATHER DETECTION SYSTEMS AND METHODS

TECHNICAL FIELD

One or more embodiments relate generally to weather detection radar and, more particularly, for example, to a passive radar weather detection system for accurate radar weather mapping.

BACKGROUND

In the field of weather detection such as to assist modern airliners in flight route planning, there is an ongoing effort to provide an accurate radar weather map along remote flight corridors. Thus, there is a need for radar weather detection solutions that may provide performance or other advantages over conventional radar weather detection systems.

SUMMARY

Systems and methods are disclosed herein in accordance with one or more embodiments that provide an improved approach to providing accurate, timely, and economical weather detection. In some embodiments, a radar weather detection system is implemented as one or more passive radar receivers distributed at multiple locations within an area where weather mapping is desired. In one example, radar signals emitted by one or more radar transmitter sources are reflected off atmospheric objects and received by one or more passive radar receivers not associated with the radar transmitter sources. The one or more passive radar receivers provide radar data to a data center. The data center is configured to receive and process the radar data. The data center may be located near the passive radar receivers and receive radar data by a wired connection. The data center may be remotely located from the passive radar receivers and receive radar data by a wireless communication network.

In one embodiment, a method includes receiving wirelessly, by one or more passive radar receivers, location information from each of one or more radar transmitter sources not associated with the one or more passive radar receivers; receiving by the one or more passive radar receivers, radar signals provided by the one or more radar transmitter sources remotely located from the passive radar receivers; and processing the radar signals to form a radar image of an atmospheric object in the path of the radar transmitter sources.

In another embodiment, a system includes one or more passive radar receivers configured to receive a plurality of radar signals provided by one or more radar transmitter sources not associated with the one or more passive radar receivers, wherein the one or more passive radar receivers are configured to receive a position information signal from each of the one or more radar transmitter sources remotely located from the passive radar receivers; a data center configured to receive and store the plurality of radar signals from the one or more passive radar receivers; and a processor configured to process the plurality of radar signals to form a radar image of an atmospheric object in the path of the radar transmitter sources.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

DETAILED DESCRIPTION

Conventional weather radar systems on commercial aircraft provide pilots and flight operators with instantaneous detection of meteorological features in the aircraft flight path. For example, commercial aircraft weather radar is selectable among various ranges (e.g., short range, less than 25 nautical miles (nm); medium range, 25 nm to 50 nm; and long range, 50 nm to 100 nm). A pilot may rely on instantaneous radar information to deviate through a storm but may not detect a stronger cell off scale of the radar display at a greater distance.

Furthermore, a single aircraft weather radar may show scatter, but does not build a three dimensional picture of a cloud structure. Due to the effects of attenuation, what appears to be a thin band of precipitation on the weather radar display may be the leading edge of a larger area of extreme precipitation. Therefore, the size, shape and intensity of the weather displayed to a pilot may not be accurate.

Alternatives are available to assist in providing more accurate and timely weather radar, such as Weather and Radar Processor (WARP) Next-Generation Radar (NEXRAD). However, these weather profilers are large and deployed sparsely. For example, NEXRAD may not be available in remote land regions and large areas of open water. Furthermore, equipping aircraft with improved weather radar detectors or Doppler lidar would be costly to install, certify and maintain. Therefore, conventional weather radar may not provide accurate, timely and economical weather detection information to aircraft operators and others who depend on weather detection information.

As set forth above, these approaches fail to provide an accurate and economical weather detection radar system. In contrast, in accord with one or more embodiments, passive radar weather detection systems and methods are described herein that provide an accurate representation of cloud formations and movements along remote flight corridors using radar transmitter sources not associated with passive radar receivers. The radar transmitter sources are configured to provide location position information to the passive radar receivers.

Figure 1:
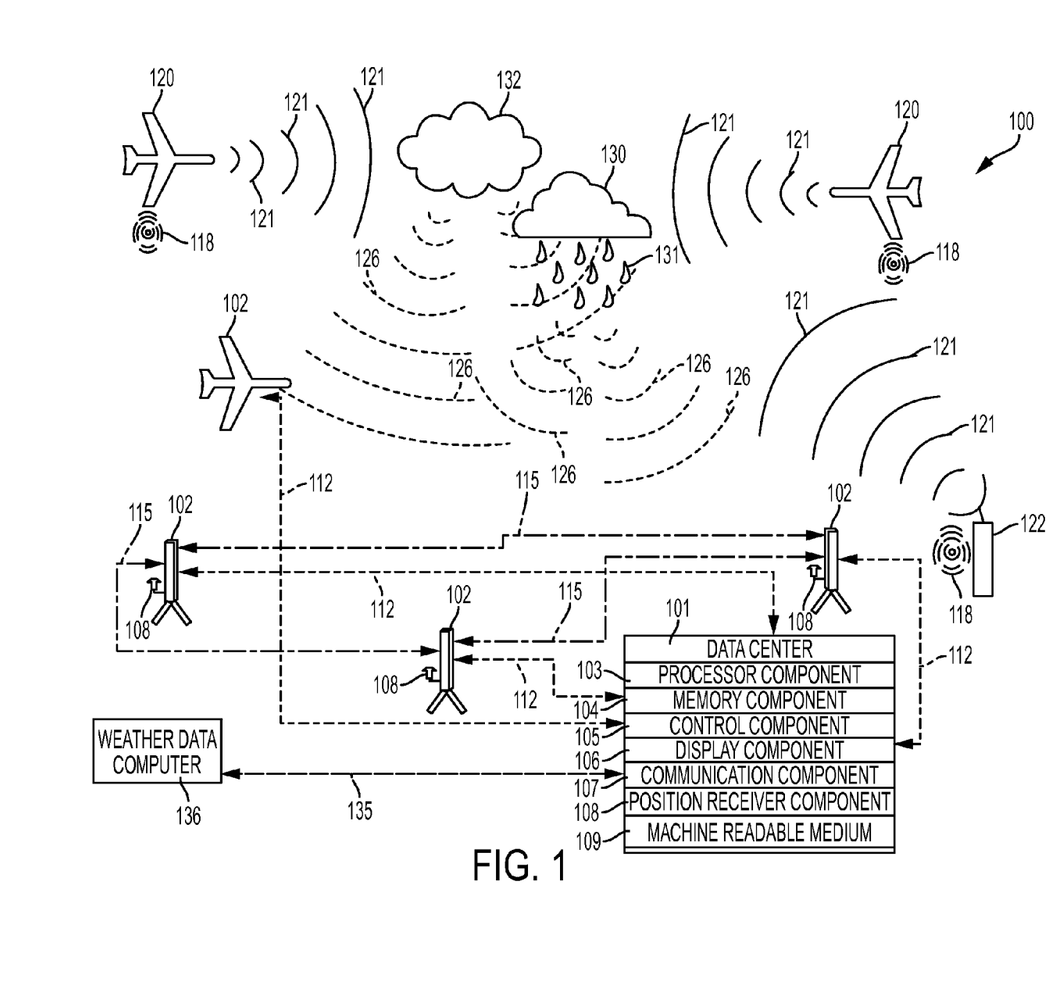
FIG. 1 illustrates a diagram of a passive radar weather detection system in accordance with an embodiment of the disclosure.

FIG. 1 illustrates a diagram of a passive radar weather detection system 100 in accordance with an embodiment of the disclosure. Passive radar weather detection system 100 may be used to capture and process reflected radar pulse data in accordance with various techniques described herein. In one embodiment, various components of passive radar weather detection system 100 may be provided in passive radar receiver 102. In another embodiment, one or more components of passive radar weather detection system 100 may be implemented remotely from each other in a distributed fashion (e.g., networked or otherwise).

In one embodiment, passive radar weather detection system 100 includes one or more passive radar receivers 102 and a data center 101 configured to receive and store the plurality of radar signals from the one or more passive radar receivers 102. In some embodiments, data center 101 may include a processor component 103, a memory component 104, a control component 105, a display component 106, a communication component 107, a position receiver component 108 and/or a machine readable medium 109.

In various embodiments, passive radar weather detection system 100 may be implemented as a passive radar receiver, such as passive radar receiver 102, implemented to receive a plurality of radar signals 126 (e.g., reflected pulsed radar signals) from one or more radar transmitter sources not associated with passive radar weather detection system 100. Radar transmitter sources (e.g., radar transmitter sources 120 and/or 122) may be configured to transmit one or more radar pulses 121. Radar transmitter sources may include an airborne transmitter source 120 coupled to, for example, an airplane, and/or a land based transmitter source 122 coupled to a mobile and/or a stationary platform. Other airborne radar transmitter sources may include a spacecraft, a blimp, a balloon and/or other aircraft.

In some embodiments, passive radar receiver 102 may include a radar receiver, a low gain antenna, a radar transmitter position receiver, and a communication interface component housed in a protective enclosure. Passive radar weather detection system 100 may represent any type of passive radar receiver 102. For example, passive radar receiver 102 may be stationary and/or mobile land based, coupled to an aircraft (e.g., a commercial airplane), and/or coupled to a watercraft (e.g., an ocean buoy). Passive radar receiver 102 may be configured with a bandwidth and a dynamic range capable of receiving and processing reflected radar pulses in various frequency bands (e.g., C-band, S-band, X-band and/or other frequency bands to receive radar signals) and provide representative radar data (e.g., one or more reflected radar pulse data and/or radar geometry data).

Processor component 103 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein. Processor component 103 is adapted to interface and communicate with components 104, 105, 106, 107, and 108 to perform method and processing steps as described herein. In various embodiments, it should be appreciated that processing operations and/or instructions may be integrated in software and/or hardware as part of processor component 103, or code (e.g., software or configuration data) which may be stored in memory component 104. Embodiments of processing operations and/or instructions disclosed herein may be stored by a machine readable medium 109 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 109 may be included as part of passive radar weather detection system 100 and/or separate from passive radar weather detection system 100, with stored instructions provided to passive radar weather detection system 100 by coupling the machine readable medium 109 to passive radar weather detection system 100 and/or by passive radar weather detection system 100 downloading (e.g., via a wired or wireless link) the instructions from the machine readable medium (e.g., containing the non-transitory information). In various embodiments, as described herein, instructions provide for real time applications of processing various reflected radar pulse data.

Memory component 104 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processor component 103 is adapted to execute software stored in memory component 104 and/or machine-readable medium 109 to perform various methods, processes, and operations in a manner as described herein.

Processor component 103 may be adapted to receive radar signals 126 (e.g., reflected pulsed radar signals) from passive radar receiver 102, process radar signals 126 to provide processed radar data, store radar signals 126 and/or radar data in memory component 104, and/or retrieve stored radar signals 126 and/or radar data from memory component 104. In various aspects, processor component 103 may be remotely positioned, and processor component 103 may be adapted to remotely receive radar data from passive radar receiver 102 via wired or wireless communication as described herein.

Processor component 103 may be adapted to process the plurality of radar signals 126 to form a radar image of an atmospheric object (e.g., cloud systems 130 and/or 132) in the path of the radar transmitter sources (e.g., radar transmitter sources 120). For example, processor component 103 may fuse the plurality of radar signals 126 received by one or more passive radar receivers 102 to create a three dimensional graphical product of an atmospheric object in the path of radar transmitter sources 120. Atmospheric objects may include meteorological objects such as water droplets in clouds, precipitation, ice crystals, moisture-laden volcanic ash, and/or other related meteorological objects. Processor component 103 may detect precipitation 131, for example, in cloud system 130. Processor component 103 may detect migratory birds, bats, and/or insects.

Processor component 103 may be adapted to process radar signals 126 stored in memory component 104 to provide radar data (e.g., captured and/or processed radar data) to display component 106 for viewing by a user. Display component 106 includes, in one embodiment, an image display device (e.g., a liquid crystal display (LCD)) or various other types of generally known video displays or monitors. Processor component 103 may be adapted to display radar data and information on display component 106. Processor component 103 may be adapted to retrieve radar data and information from memory component 104 and display any retrieved radar data and information on display component 106. Display component 106 may include display electronics, which may be utilized by processor component 103 to display radar data and information. Display component 106 may receive radar data and information directly from passive radar receiver 102 via processor component 103, or the radar data and information may be transferred from memory component 104 via processor component 103.

Control component 105 includes, in one embodiment, a user input and/or interface device having one or more user actuated components, such as one or more push buttons, slide bars, rotatable knobs or a keyboard, that are adapted to generate one or more user actuated input control signals. Control component 105 may be adapted to be integrated as part of display component 106 to operate as both a user input device and a display device, such as, for example, a touch screen device adapted to receive input signals from a user touching different parts of the display screen. Processor component 103 may be adapted to sense control input signals from control component 105 and respond to any sensed control input signals received therefrom. Control component 105 may include, in one embodiment, a control panel unit (e.g., a wired or wireless handheld control unit) having one or more user-activated mechanisms (e.g., buttons, knobs, sliders, or others) adapted to interface with a user and receive user input control signals.

Processor component 103 may be adapted to communicate with passive radar receiver 102 (e.g., by receiving radar data and information from passive radar receiver 102) via communication component 107. Passive radar receiver 102 may be configured to communicate radar data to communication component 107 via a wired or wireless communication interface link 112, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, passive radar receiver 102 may include an antenna coupled thereto for wireless communication to communication component 107. Furthermore, one or more passive radar receivers 102 may be adapted to communicate with other passive radar receivers 102 via a wired or wireless communication interface link 115. Communication interface link 115 may be configured similar to communication interface link 112, as described herein.

In some embodiments, processor component 103 may be configured to provide a radar geometry data and/or three dimensional graphical products of the atmospheric object to a weather data computer 136 via communication component 107. Processor component 103 may be configured to communicate radar geometry data and/or three dimensional graphical products to weather data computer 136 via a wired or wireless communication interface link 135. Communication interface link 135 may be configured similar to communication interface link 112, as described herein. Weather data computer 136 and/or data center 101 may provide real-time accurate weather detection to assist airline pilots in flight route planning and hazardous weather avoidance.

Passive radar weather detection system 100 may include a position receiver component 108 (e.g., a second receiver) adapted to interface with one or more radar transmitter sources (e.g., via wired or wireless communication) to receive a position information signal 118 from each of the one more radar transmitter sources (e.g., one or more radar transmitter sources 120 and/or 122). Position receiver component 108 may be configured to process position information signal 118 and provide radar transmitter sources position information to processor component 103. In some embodiments, position information signal 118 may be an automatic dependent surveillance-broadcast (ADS-B) signal which periodically broadcasts radar transmitter sources 120 and/or 122 identification and current position information. In other embodiments, position information signal 118 may contain global positioning information to provide radar transmitter source current position. A signal receiving antenna may be included with position receiver component 108 to wirelessly receive radar transmitter sources position information signal 118. In some embodiments, position receiver component 108 may be included in data center 101. In other embodiments, position receiver component 108 may be integrated within passive radar receiver 102 to receive position information signal 118 from each of the one or more radar transmitter sources 120 and/or 122.

In one embodiment, communication component 107 may be implemented as a network interface component (NIC) adapted for communication with a network including other devices in the network. In various embodiments, communication component 107 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 107 may include an antenna coupled thereto for wireless communication purposes. In other embodiments, communication component 107 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, passive radar weather detection system 100 may be associated with a particular network link such as for example a URL (Uniform Resource Locator), an IP (Internet Protocol) address, and/or a mobile phone number.

Figure 2:
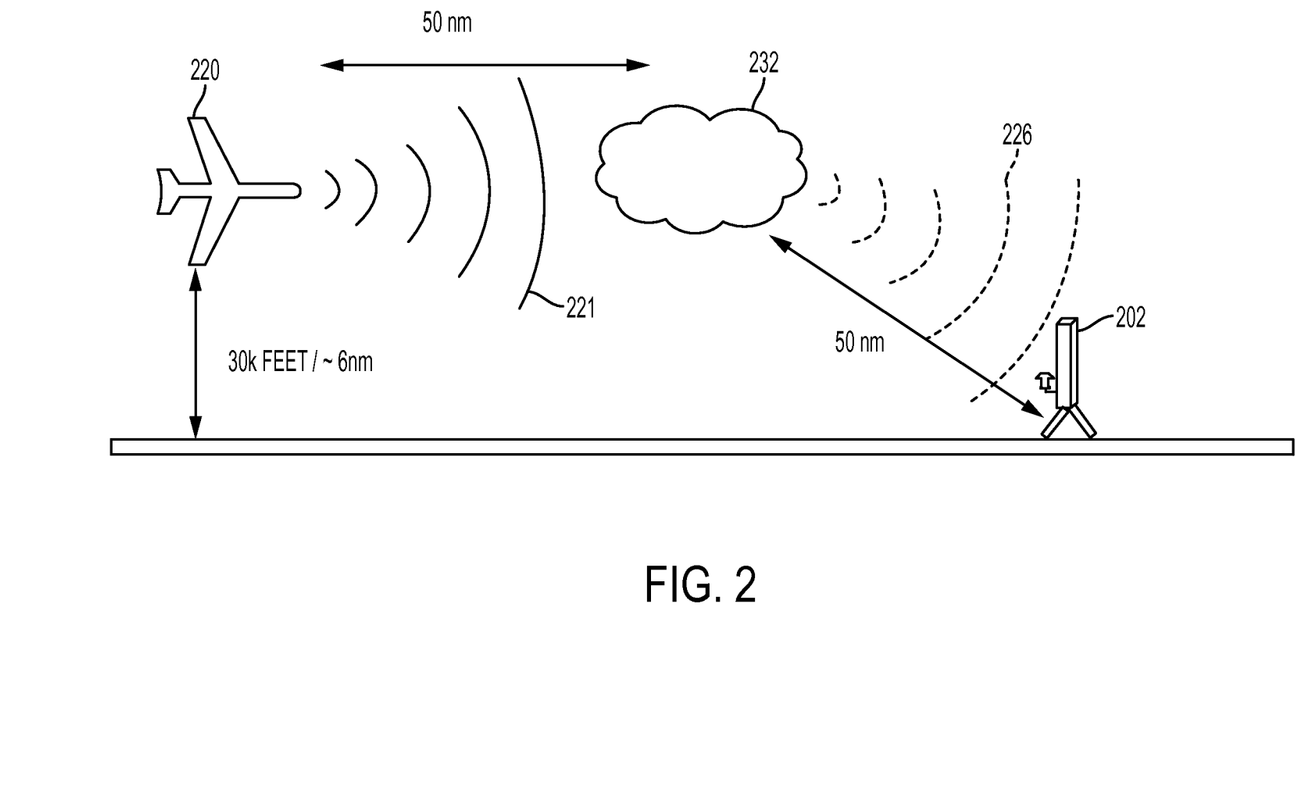
FIG. 2 illustrates a range capability of a passive radar weather detection system in accordance with an embodiment of the disclosure.

FIG. 2 illustrates a range capability of a passive radar weather detection system 100 in accordance with an embodiment of the disclosure. Range capability of passive radar weather detection system 100 is determined, in part, by the sensitivity of a passive radar receiver 202. FIG. 2 illustrates passive radar receiver 202 configured with a substantially similar radar receiver range capability of an airplane radar 220 (e.g., radar transmitter source and radar receiver). For example, airplane radar 220 range may be optimized, for example, to 50 nautical miles (or to any other range setting depending on capabilities, application, conditions, and potential target size and reflectivity, for example) to cloud system 232. Passive radar receiver 202 with substantially similar radar receiver sensitivity as airplane radar 220, may be located approximately 50 nautical miles on the other side of cloud system 232 as shown in FIG. 2. Radar signals 226 reflected off cloud system 232 and/or radar signals 221 transmitted directly from airplane radar 220 transmitter may be received by passive radar receiver 202. In this regard, the range of the radar is effectively doubled with passive radar receiver 202 as shown in FIG. 2. Furthermore, radar signals capable of penetrating cloud system 232 may be received and processed by passive radar receiver 202 providing a three dimensional radar image of cloud system 232. Therefore, passive radar receiver 202 not associated with airplane radar 220 and geographically located as illustrated in FIG. 2 may provide a more complete radar cross section of the atmospheric object (e.g., cloud system 232) in the path of the radar transmitter source.

Figure 3A:
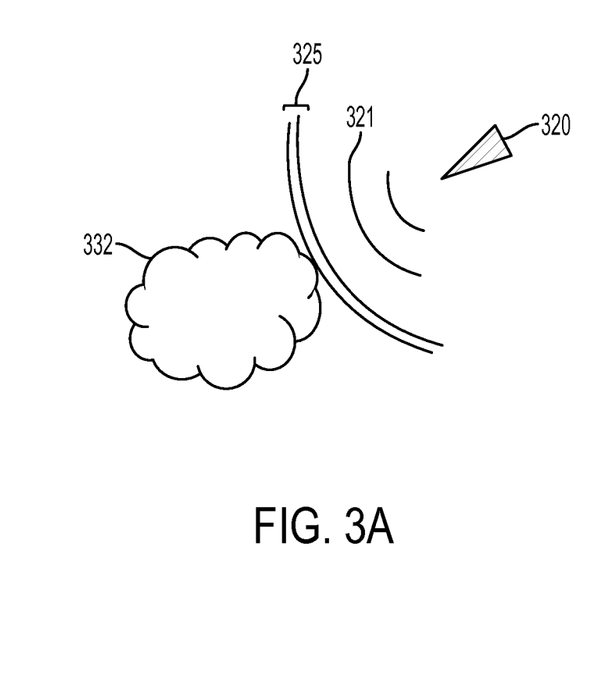
FIGS. 3A and 3B illustrate radar range resolution perspectives of radar weather detection systems in accordance with embodiments of the disclosure.
Figure 3B:
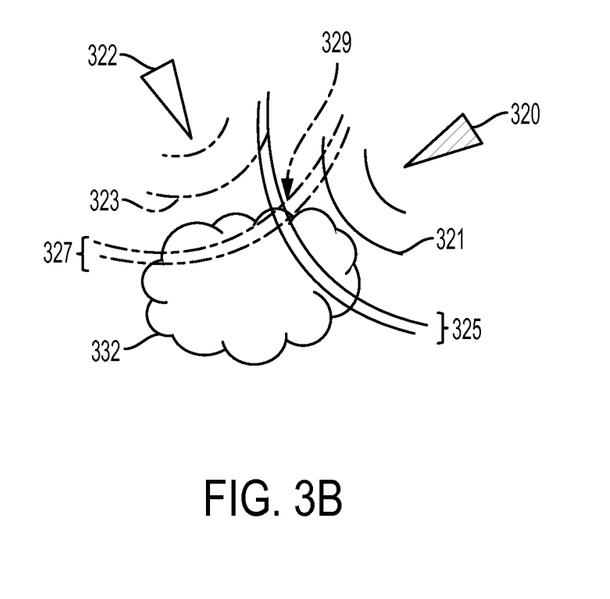

FIGS. 3A and 3B illustrate radar range resolution perspectives of radar weather detection systems in accordance with embodiments of the disclosure. FIG. 3A illustrates a monostatic radar weather detection system range resolution perspective. In FIG. 3A, an airplane radar transmitter source 320 may emit a pulsed radar signal 321 in the direction of a cloud system 332. A single range gate 325 may be formed with each pulsed radar signal 321 emitted from airplane transmitter source 320. Range gate 325 areal size may become larger with increasing distance from the airplane transmitter source 320. An expanding range gate 325 results in less resolution of the reflected pulsed radar signal since each range gate represents the average of reflected pulsed radar signals within range gate 325 (e.g., one reflected radar data value). For example, cloud system 332 may be a small portion of range gate 325 and although cloud system 332 may contain heavy precipitation, range gate 325 may show a broader area of less precipitation due to averaging within range gate 325. In this regard, radar data may be distorted (e.g., an overestimation of the area of precipitation) resulting in a less reliable weather radar detection capability.

FIG. 3B illustrates a multistatic radar weather detection system range resolution perspective. In FIG. 3B, airplane transmitter sources 320 and 322 may emit pulsed radar signals 321 and 323, respectively. Range gate 325 may be associated with pulsed radar signal 321 and range gate 327 may be associated with pulsed radar signal 323. As range gates 325 and 327 propagate, they may overlap at range gate overlap 329. Range gates 325, 327, and overlap 329 may provide for a reliable weather map since reflected radar signals from multiple range gates may be received by multiple passive radar receivers 102 to provide an accurate radar image of cloud system 332. In this regard, passive radar weather detection system 100 may take advantage of multiple range gates 325, and 327 to provide for an undistorted range resolution than that provided by the monostatic radar system range resolution.

Figure 4:
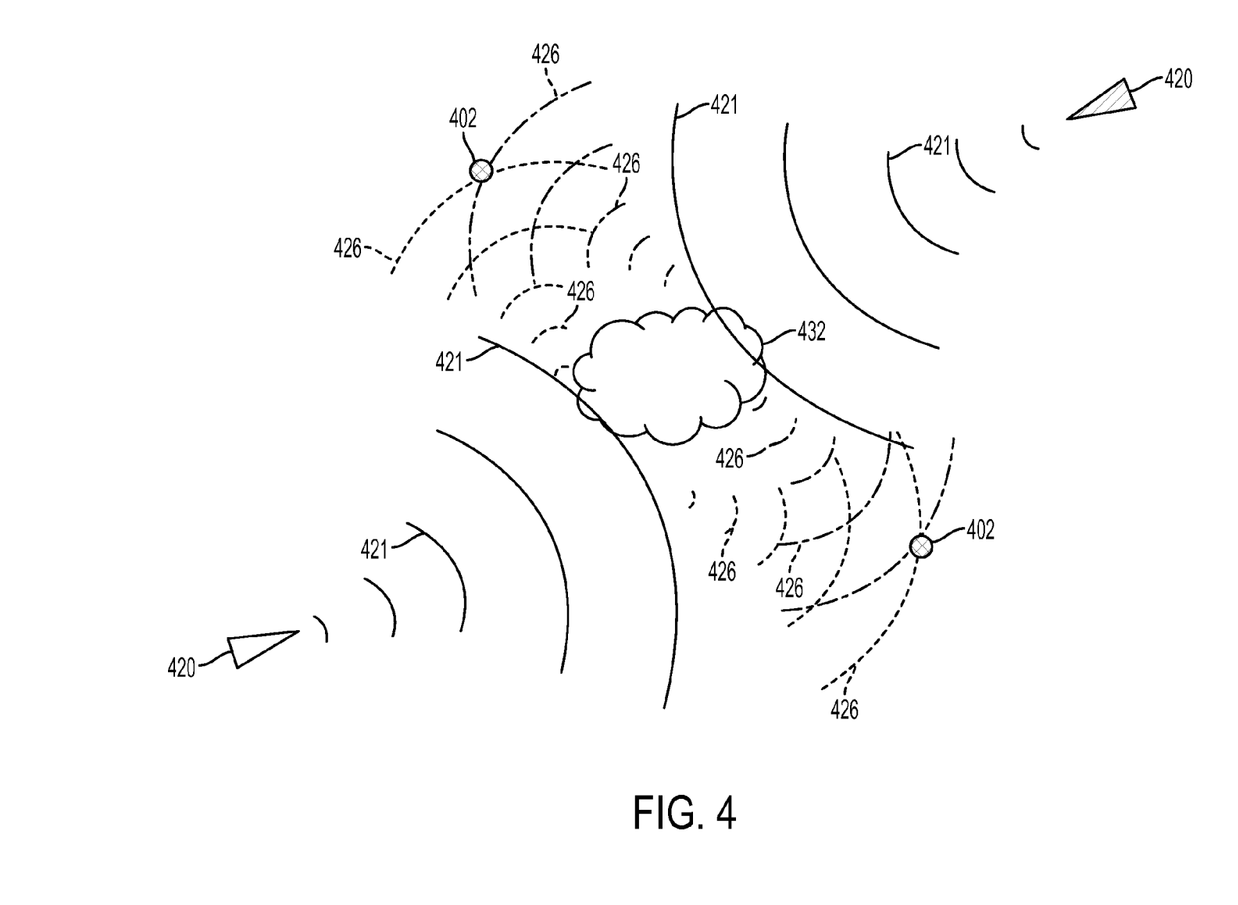
FIG. 4 illustrates an atmospheric scene of a passive radar weather detection system in accordance with an embodiment of the disclosure.

FIG. 4 illustrates an atmospheric scene of a passive radar weather detection system 100 in accordance with an embodiment of the disclosure. In FIG. 4, two radar transmitter sources 420 may be emitting pulsed radar signals 421. Pulsed radar signals 421 may reflect off cloud system 432 to produce reflected pulsed radar signals 426. As shown in FIG. 4, pulsed radar signals 421 may be reflected off various sides and elevations of cloud system 432. Multiple passive radar receivers 102 may receive reflected radar signals 426 (e.g., reflected radar signals 426 from both radar transmitter sources 420). Transmitter sources 420 may not receive all reflected pulsed radar signals 426 received by multiple radar receivers 102 due to severe atmospheric conditions present in cloud system 432. For example, reflected pulsed radar signal 426 may be attenuated in cloud system 432 due to heavy precipitation resulting in reduced radar signal reflectivity to radar transmitter source 420. A processed radar image of cloud system 432 may display an inaccurate size and shape, and may distort an intensity of cloud system 432. Multiple radar receivers 402 may receive reflected pulsed radar signals 426 from multiple radar transmitter sources 420 at multiple angles of cloud system 432 to provide for an accurate and reliable processed image of cloud system 432 size, shape, and intensity. Furthermore, multiple radar receivers 402 placed at various distances along a flight path may provide radar image data beyond the capability of a single radar range.

Multiple radar receivers 102 may provide for an accurate estimation of severe weather, for example, when multiple radar transmitter sources are emitting pulsed radar signals 421 at multiple elevations. Low reflectivity ice particles at higher elevations and highly reflective wet rain at lower elevations may provide for an accurate processed image of cloud system 432. In this regard, passive radar weather detection system 100 provides for increased spatial resolution by taking advantage of multiple range gates from multiple transmitter sources 420 at multiple elevations and providing three dimensional processed radar images.

In some embodiments, multiple passive radar receivers 402 may provide multiple angle views of cloud system 432 to provide multiple direction vectors (e.g., cloud to receiver direction vector and cloud to transmitter direction vector). An actual wind vector may be accurately determined with at least two direction vectors.

Figure 5:
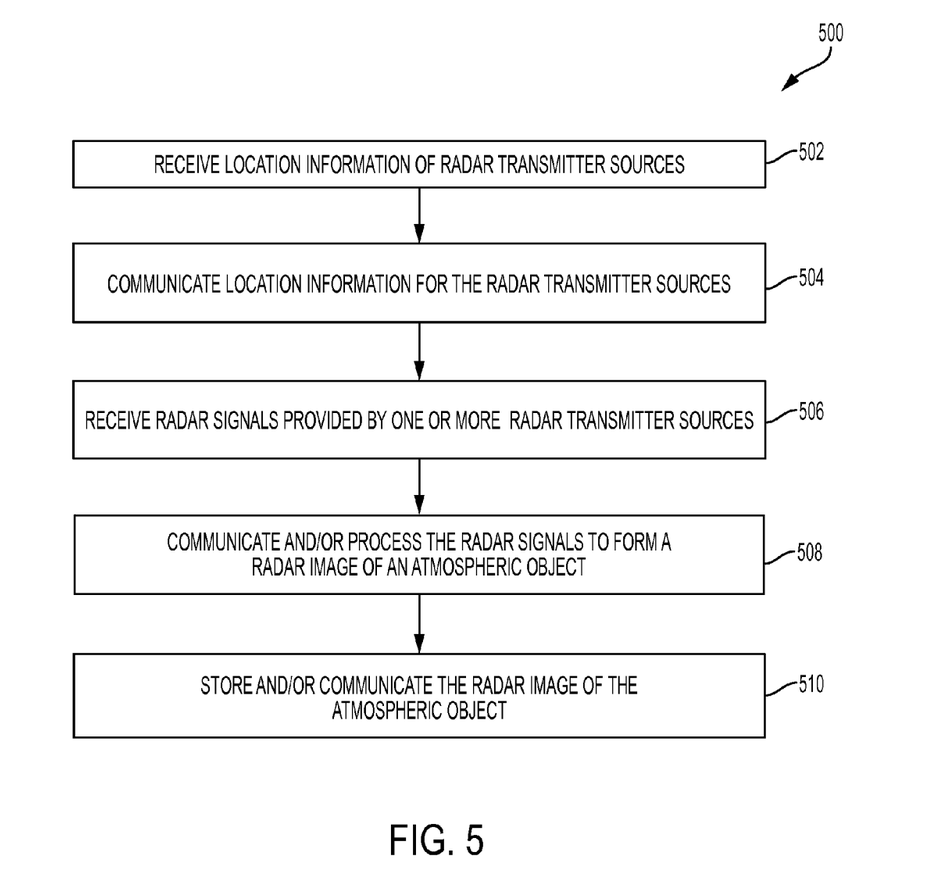
FIG. 5 illustrates a flow diagram describing a method for using a passive radar weather detection system in accordance with an embodiment of the disclosure.

FIG. 5 illustrates a flow diagram 500 describing a method for using a passive radar weather detection system 100 in accordance with an embodiment of the disclosure.

In block 502, a position information signal 118 is provided by each radar transmitter source 120 and/or 122 to provide an identification and location of radar transmitter source. A signal receiving antenna coupled to a position receiver 108 may receive position information signal 118 from each of the one or more radar transmitter sources (e.g., 120 and/or 122) not associated with one or more passive radar receivers 102. Position information signal 118 may include an automatic dependent surveillance-broadcast (ADS-B), a global positioning system (GPS) information signal, a Global Navigation Satellite System (GNSS) or other type of geographic position location systems.

In block 504, position receiver 108 may process position information signal 118 and provide radar transmitter source position information to processor component 103 for each radar transmitter source. In some embodiments, position receiver component 108 may be included in a data center 101. In other embodiments, position receiver component 108 may be integrated within passive radar receiver 102. Radar transmitter source position information may be used by processor component 103 to aid in processing radar data.

In block 506, one or more passive radar receivers 102 receive a plurality of reflected pulsed radar signals 126 provided by the one or more radar transmitter sources (e.g., radar transmitter sources 120 and/or 126) remotely located from the passive radar receivers 102. The reflected pulsed radar signals 126 may include overlapping reflected radar signals 126 from the one or more transmitter sources. Overlapping radar signals provide for radar data processing advantages by producing accurate processed weather radar image data. An increased range determination and spatial resolution of an atmospheric object may be possible using overlapping radar signals.

In block 508, the plurality of radar signals 126 are provided to processor component 103 by the one or more passive radar receivers. Processor component 103 may process the plurality of radar signals 126 to form a radar image of an atmospheric object in the path of the radar transmitter sources. In this regard, processor component 103 may fuse the plurality of radar signals 126 received by one or more passive radar receivers 102 to create a three dimensional graphical product of an atmospheric object in the path of radar transmitter sources 120. Processor component 103 may determine a velocity, a direction and an altitude of a detected object using two or more direction vectors determined from the plurality of reflected pulsed radar signals 126 provided by two or more passive radar receivers 102.

Atmospheric objects may include meteorological objects such as water droplets in clouds, precipitation, ice crystals, moisture-laden volcanic ash, and/or other related meteorological objects. Processor component 103 may detect precipitation 131, for example, in cloud system 130. Processor component 103 may detect migratory birds, bats, and/or insects.

In block 510, processor component 103 may store the plurality of radar signals 126, the radar geometry, and/or the processed radar images in memory component 104. Processor component 103 may provide radar geometry data and/or the three dimensional graphical product of the atmospheric object to a weather data computer 136 for use with flight route planning or other uses that require accurate weather detection information. In some embodiments, flow diagram 500 may be repeated, beginning again at block 502. In other embodiments, flow diagram may continuously loop from blocks 502 to 510.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable media. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
   receiving wirelessly, by one or more passive radar receivers, location information from each of one or more radar transmitter sources not associated with the one or more passive radar receivers;
   receiving by the one or more passive radar receivers, radar signals provided by the one or more radar transmitter sources remotely located from the passive radar receivers; and
   processing the radar signals to form a radar image of an atmospheric object in the path of the radar transmitter sources.

2. The method of claim 1, wherein the receiving location information comprises:
   receiving a position information signal from an automatic dependent surveillance-broadcast (ADS-B) and/or global positioning system (GPS) information; and
   wherein the receiving the position information signal is performed by a signal receiving antenna coupled to a second receiver at the passive radar receiver, wherein the second receiver processes and provides the radar transmitter sources position information.

3. The method of claim 1, wherein:
   the one or more radar transmitter sources are mobile land based, stationary land based, and/or coupled to an aircraft; and
   the radar transmitter sources and the passive radar receivers are not co-located.

4. The method of claim 1, wherein the one or more passive radar receivers are mobile land based, stationary land based, coupled to an aircraft, and/or coupled to a watercraft.

5. The method of claim 1, wherein the receiving radar signals by the one or more passive radar receivers comprises receiving overlapping radar signals provided by the one or more radar transmitter sources to provide a range determination and a spatial resolution of the atmospheric object.

6. The method of claim 1, wherein the processing comprises fusing the radar signals received by the one or more passive radar receivers.

7. The method of claim 1, wherein the processing comprises:
   detecting one or more objects comprising at least one of birds, bats, insects, water droplets in clouds, precipitation, and/or moisture-laden volcanic ash; and
   determining a velocity, a direction, and an altitude of the one or more detected objects, and/or determining a volume and/or a geometry of the one or more detected objects.

8. The method of claim 1, wherein the processing further comprises providing radar geometry data and/or three dimensional graphical products of the atmospheric object to a weather data computer.

9. A system for performing the method of claim 1 comprising:
   one or more passive radar receivers configured to receive a plurality of radar signals provided by one or more radar transmitter sources;
   a data center configured to receive and store the plurality of radar signals from the one or more passive radar receivers; and
   a processor configured to process the plurality of radar signals to form a radar image of an atmospheric object in the path of the one or more radar transmitter sources.

10. A system comprising:
    one of more passive radar receivers configured to receive a plurality of radar signals provided by one or more radar transmitter sources not associated with the one or more passive radar receivers, wherein the one or more passive radar receivers are configured to receive a position information signal from each of the one or more radar transmitter sources remotely located from the passive radar receivers;

a data center configured to receive and store the plurality of radar signals from the one or more passive radar receivers; and a processor configured to process the plurality of radar signals to form a radar image of an atmospheric object in the path of the radar transmitter sources.

11. The system of claim 10, wherein the position information signal is received from an automatic dependent surveillance-broadcast (ADS-B) and/or global positioning system (GPS) information.

12. The system of claim 10, further comprising:

a signal receiving antenna configured to receive the position information signal; and a second receiver coupled to the signal receiving antenna to receive the position information signal, wherein the second receiver is configured to process and provide the radar transmitter sources position information.

13. The system of claim 10, wherein:

the one or more radar transmitter sources are mobile land based, stationary land based, and/or coupled to an aircraft; and the radar transmitter sources and the passive radar receivers are not co-located.

14. The system of claim 10, wherein:

the one or more passive radar receivers are stationary land based, mobile land based, coupled to an aircraft, and/or coupled to a watercraft.

15. The system of claim 10, wherein the data center comprises a processor component, a memory component, a control component, a display component, a communication component, and a position receiver component.

16. The system of claim 10, wherein the one or more passive radar receivers are each coupled to the other passive radar receivers by a communication link.

17. The system of claim 10, wherein the processor is configured to:

fuse the plurality of radar signals received by the one or more passive radar receivers;

detect one or more objects comprising at least one of birds, bats, insects, water droplets in clouds, precipitation, and/or moisture-laden volcanic ash; and determine a velocity, a direction, and an altitude of the one or more detected objects, and/or determine a volume and/or a geometry of the one or more detected objects.

18. The system of claim 10, wherein the processor is configured to execute a plurality of instructions stored in a memory to process the plurality of radar signals.

19. The system of claim 10, wherein the processor is configured to provide radar geometry data and/or three dimensional graphical products of the atmospheric object to a weather data computer.

20. A method of using the system of claim 10, the method comprising:

receiving location information from each of the one or more radar transmitter sources;

communicating the location information for each of the one or more radar transmitter sources to the data center;

receiving by the one or more passive radar receivers, the plurality of radar signals provided by the one or more radar transmitter sources; and communicating and/or processing the plurality of radar signals to form a radar image of the atmospheric object in the path of the radar transmitter sources.

* * * * *